(12) United States Patent
Togashi

(10) Patent No.: US 12,356,065 B2
(45) Date of Patent: Jul. 8, 2025

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Go Togashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 18/455,772

(22) Filed: Aug. 25, 2023

(65) Prior Publication Data

US 2024/0073509 A1 Feb. 29, 2024

(30) Foreign Application Priority Data

Aug. 31, 2022 (JP) ................................. 2022-138339

(51) Int. Cl.
*H04N 23/611* (2023.01)
*H04N 23/60* (2023.01)
*H04N 23/661* (2023.01)
*H04N 23/90* (2023.01)

(52) U.S. Cl.
CPC ........... *H04N 23/611* (2023.01); *H04N 23/64* (2023.01); *H04N 23/661* (2023.01); *H04N 23/90* (2023.01)

(58) Field of Classification Search
CPC .... H04N 23/611; H04N 23/64; H04N 23/661; H04N 23/90; H04N 23/50; H04N 23/6811; H04N 23/685; H04N 23/69
USPC ....................................................... 348/222.1
See application file for complete search history.

(56) References Cited

U.S. PATENT DOCUMENTS

| | | | | |
|---|---|---|---|---|
| 2004/0109587 A1* | 6/2004 | Segawa | ................... | G06F 16/58 |
| | | | | 707/E17.026 |
| 2012/0237090 A1* | 9/2012 | Ikenoue | ................... | G06F 16/68 |
| | | | | 707/E17.046 |

FOREIGN PATENT DOCUMENTS

JP 2007-110619 A 4/2007

* cited by examiner

*Primary Examiner* — Usman A Khan
(74) *Attorney, Agent, or Firm* — Cowan, Liebowitz & Latman, P.C.

(57) ABSTRACT

An image capturing apparatus to be used in an image capturing system that includes a plurality of image capturing apparatuses includes a detection unit configured to detect a subject, an authentication unit configured to authenticate correspondence between the subject and identification information of a user, an obtainment unit configured to obtain shooting conditions associated with the subject authenticated by the authentication unit, an image capturing unit configured to capture an image of the subject under the shooting conditions, a count unit configured to count the number of captured images of the subject for each of the plurality of shooting conditions, and a notification unit configured to notify a controller of another image capturing apparatus included among the plurality of image capturing apparatuses of the number of counts counted by the count unit.

16 Claims, 8 Drawing Sheets

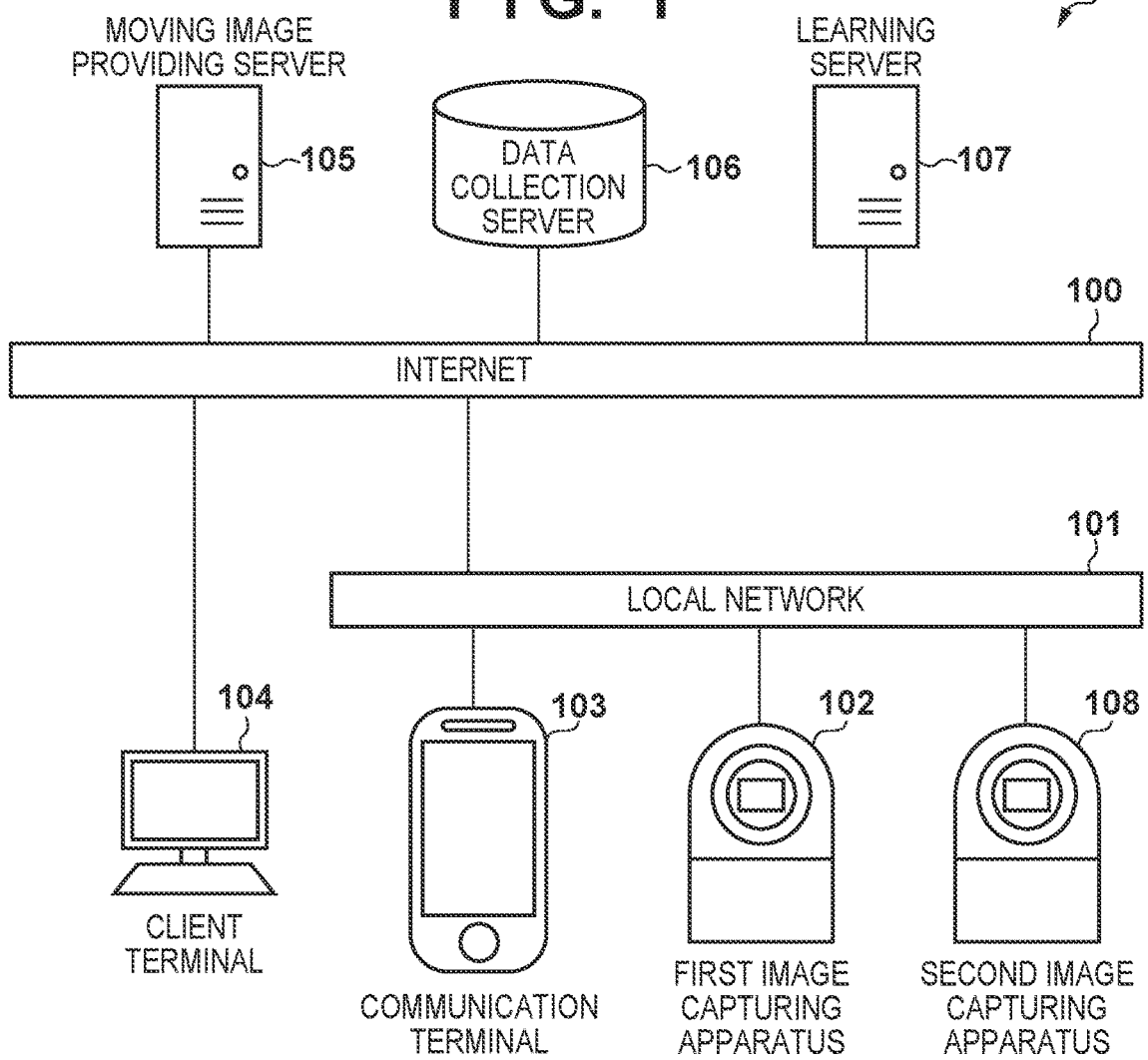
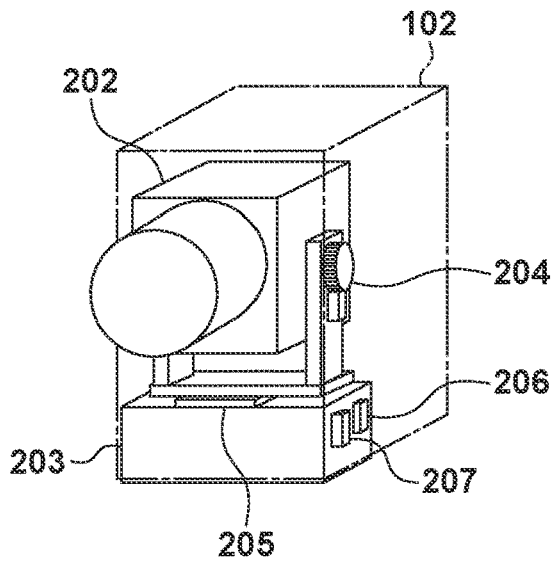
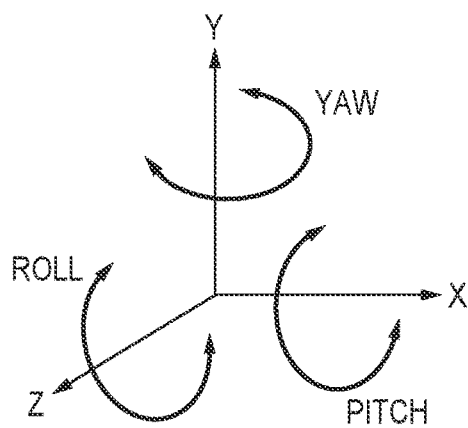

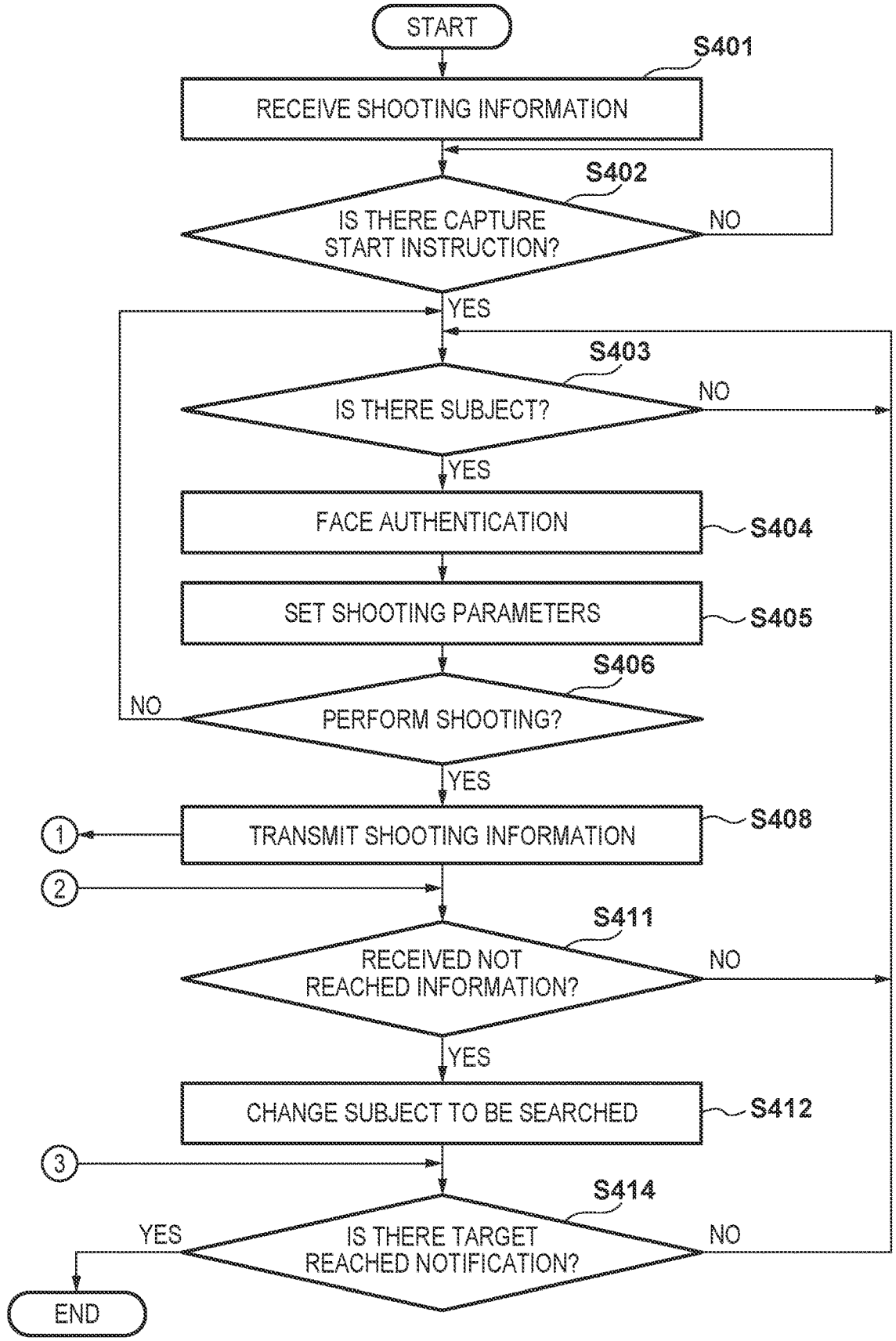

FAMILY A PURCHASE ANALYSIS DATA

FAMILY B PURCHASE ANALYSIS DATA

FAMILY C PURCHASE ANALYSIS DATA

FAMILY D PURCHASE ANALYSIS DATA

TARGET NUMBER OF SHOT IMAGES: 20
NUMBER OF FAMILY A SHOT IMAGES

TARGET NUMBER OF SHOT IMAGES: 20
NUMBER OF FAMILY B SHOT IMAGES

TARGET NUMBER OF SHOT IMAGES: 20
NUMBER OF FAMILY C SHOT IMAGES

TARGET NUMBER OF SHOT IMAGES: 20
NUMBER OF FAMILY D SHOT IMAGES

IMAGE CAPTURING APPARATUS, CONTROL METHOD THEREFOR, AND STORAGE MEDIUM

BACKGROUND OF THE INVENTION

Field of the Invention

The present invention relates to an image capturing apparatus that performs automatic shooting.

Description of the Related Art

In recent years, a system has been realized in which photographs of children, photographs showing the appearances of events, and so on that have been shot by a photographer or a stationary automatic-shooting camera are uploaded to the Internet at a later date, thereby allowing a user to select and purchase shot images.

In this case, the system side executes processing so as to facilitate the user's selection of images by grouping images corresponding to a user ID of the viewing user and suggesting the grouped images based on, for example, prior information and an image selection history. However, in the case of shooting that has been performed over a long period of time, the number of images is enormous, and images that do not match the user's preference are also included; this places a large burden on the user's selection of images.

In view of this, for example, an image capturing apparatus described in Japanese Patent Laid-Open No. 2007-110619 distinguishes the user's preference based on shot images that have been shot by the user, and enables shooting parameters of the image capturing apparatus to be changed.

However, with the technique described in Japanese Patent Laid-Open No. 2007-110619, parameters can be set only in relation to the image quality, and the user needs to search for a subject and adjust the composition and focus by him/herself. Therefore, there is a possibility that the user makes a mistake in shooting, and the user cannot make a confirmation with his/her own eyes when shooting a large number of images.

Furthermore, in a case where a plurality of subjects are shot in response to shooting requests from a plurality of users, it is difficult to change shooting parameters in accordance with the users' preferences. Moreover, when shooting is performed using one image capturing apparatus, there is a possibility of losing the shooting opportunities that match the users' preferences.

SUMMARY OF THE INVENTION

The present invention has been made in view of the aforementioned problem, and provides an image capturing apparatus that can obtain images that match the user's preference.

According to a first aspect of the present invention, there is provided an image capturing apparatus to be used in an image capturing system that includes a plurality of image capturing apparatuses, the image capturing apparatus comprising: at least one processor or circuit configured to function as: a detection unit configured to detect a subject; an authentication unit configured to authenticate correspondence between the subject and identification information of a user; an obtainment unit configured to obtain shooting conditions associated with the subject authenticated by the authentication unit; an image capturing unit configured to capture an image of the subject under the shooting conditions; a count unit configured to count the number of captured images of the subject for each of the plurality of shooting conditions; and a notification unit configured to notify a controller of another image capturing apparatus included among the plurality of image capturing apparatuses of the number of counts counted by the count unit.

According to a second aspect of the present invention, there is provided a control method for an image capturing apparatus to be used in an image capturing system that includes a plurality of image capturing apparatuses, the control method comprising: detecting a subject; authenticating correspondence between the subject and identification information of a user; obtaining shooting conditions associated with the subject authenticated in the authenticating; capturing an image of the subject under the shooting conditions; counting the number of captured images of the subject for each of the plurality of shooting conditions; and notifying a controller of another image capturing apparatus included among the plurality of image capturing apparatuses of the number of counts counted in the counting.

Further features of the present invention will become apparent from the following description of exemplary embodiments with reference to the attached drawings.

BRIEF DESCRIPTION OF THE DRAWINGS

FIG. 1 is a diagram showing a configuration of an image capturing system according to an embodiment of the present invention.

FIGS. 2A and 2B are diagrams schematically showing an image capturing apparatus used in an embodiment.

FIGS. 4A and 4B are flowcharts showing the operations of image capturing apparatuses in an embodiment.

DESCRIPTION OF THE EMBODIMENTS

Figure 3:
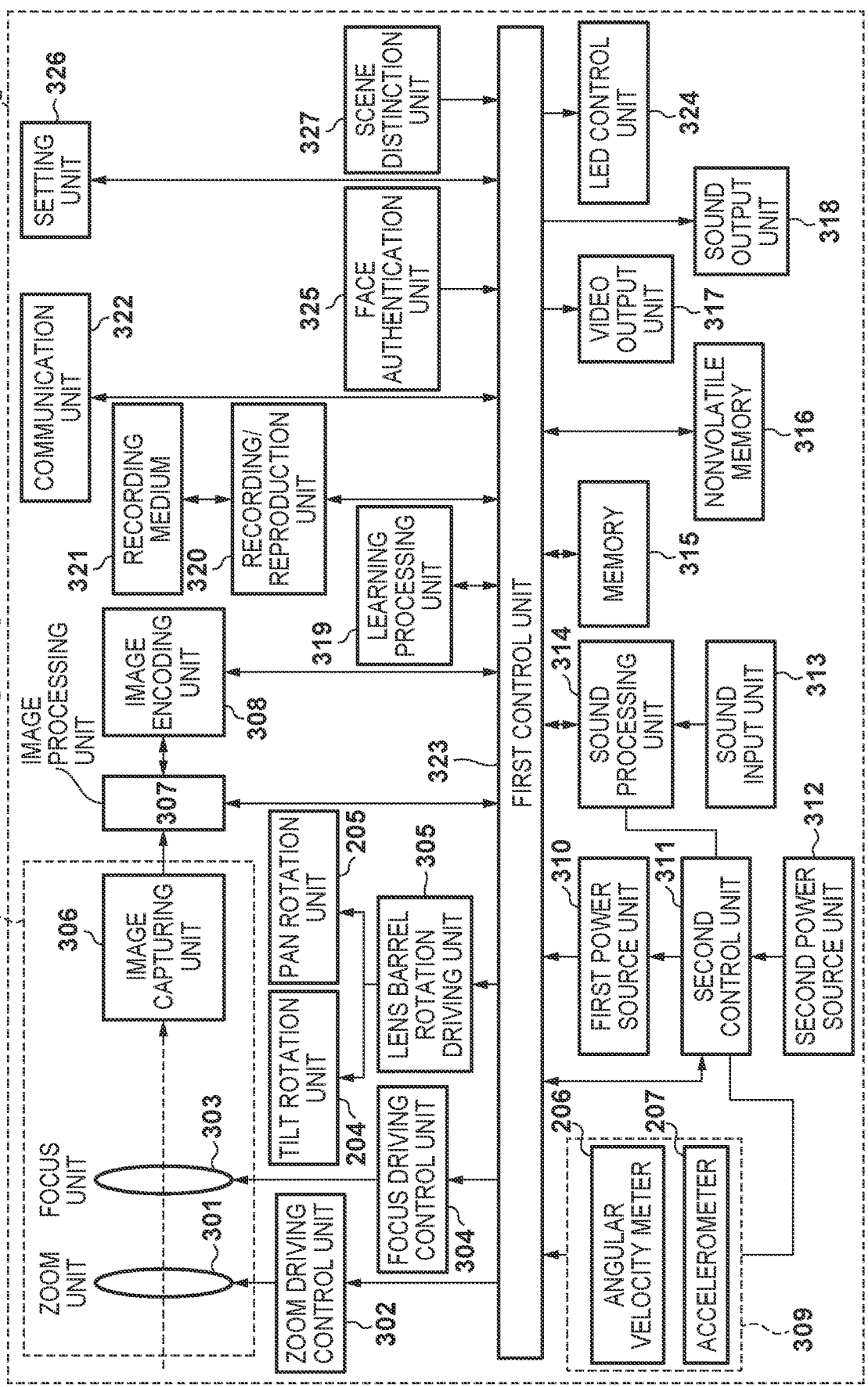
FIG. 3 is a block diagram showing a configuration of an image capturing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of System>

FIG. 1 is a diagram showing a configuration of an image capturing system 1 that uses image capturing apparatuses according to an embodiment of the present invention.

In the image capturing system 1, a client terminal 104, a moving image providing server 105, a data collection server 106, and a learning server 107 are each connected to the Internet 100. Furthermore, a first image capturing apparatus 102, a second image capturing apparatus 108, and a communication terminal 103 are mutually connected to one another via a local network 101. The local network 101 is connected to the Internet 100.

The local network 101 is a network composed of the first image capturing apparatus 102, the second image capturing apparatus 108, and the communication terminal 103 that are connected via cables or wirelessly. The first image capturing apparatus 102, the second image capturing apparatus 108, and the communication terminal 103 can mutually exchange information with one another via the local network 101.

The first image capturing apparatus 102 and the second image capturing apparatus 108 are cameras which include a later-described driving mechanism and control unit, and which can autonomously perform shooting without a user operation. The first image capturing apparatus 102 and the second image capturing apparatus 108 can change camera control using later-described learning information obtained from the learning server 107 via the local network 101, and capture still images and moving images. The still images and the moving images shot by the first image capturing apparatus 102 and the second image capturing apparatus 108 are transmitted from the communication terminal 103 to the data collection server 106 via the local network 101, and accumulated therein.

Note that the present invention is not limited to the foregoing example; for instance, the still images and the moving images may be transmitted directly from the first image capturing apparatus 102 and the second image capturing apparatus 108 to the data collection server 106 via the local network 101, and accumulated therein. Furthermore, although FIG. 1 shows two image capturing apparatuses, namely the first image capturing apparatus 102 and the second image capturing apparatus 108, a plurality of cameras may be further connected to the local network 101.

The communication terminal 103 is a communication terminal that has a communication function and is connected to the first image capturing apparatus 102 and the second image capturing apparatus 108. The communication function of the communication terminal 103 is realized by a wireless LAN communication module or a wired communication module. The communication terminal 103 has an operation mechanism of accepting a user operation, and can transmit an instruction based on information input to the operation mechanism to the first image capturing apparatus 102 and the second image capturing apparatus 108 via the local network 101. Furthermore, it can also obtain information from the learning server 107 from the Internet 100, and transmit the same to the first image capturing apparatus 102 and the second image capturing apparatus 108. Moreover, it can obtain still images and moving images shot by the first image capturing apparatus 102 and the second image capturing apparatus 108, and transmit them to the data collection server 106 via the Internet 100.

The client terminal 104 is a computer; thereon, a user can activate a web browser, and select and purchase the still images and the moving images provided by the moving image providing server 105.

The moving image providing server 105 provides the client terminal 104 with the still images and the moving images that are stored in the data collection server 106 and include, as a subject, the user him/herself, or a family member or an acquaintance of the user, in such a manner that they can be viewed and selected via the Internet 100.

In the present embodiment, an operator of the moving image providing server 105 provides a service that provides and sells the still images and the moving images shot by the first image capturing apparatus 102 to the user through a later-described image capturing sequence. The subject of the still images and the moving images that the user purchases from the operator need not necessarily be the user him/herself, or a family member or an acquaintance associated with the user. However, for the sake of convenience, the following description will be given under the assumption that the still images and the moving images that are released by the operator to the user for sale show the user him/herself, or a family member or an acquaintance of the user. Furthermore, the moving image providing server 105 transmits purchase information and non-purchase information of the user to the learning server 107.

The data collection server 106 is a computer that collects the still images and the moving images shot by the first image capturing apparatus 102 and the second image capturing apparatus 108, and transmits the still images or the moving images requested by the moving image providing server 105 to the moving image providing server 105.

The learning server 107 is a computer that generates a learning model with a later-described learning method using the purchase information and the non-purchase information of the user transmitted from the moving image providing server 105. The learning server 107 transmits the learning model to the first image capturing apparatus 102 and the second image capturing apparatus 108 via the Internet 100.

<Configuration of Image Capturing Apparatus>

FIGS. 2A and 2B are diagrams schematically showing an image capturing apparatus used in the present embodiment.

The first image capturing apparatus 102 shown in FIG. 2A includes, for example, an operation member that can perform an operation of a power source switch (which is hereinafter referred to as a power source button, but may be replaced with an operation performed on a touch panel, such as tapping, flicking, and swiping). A lens barrel 202, which is a housing that includes a shooting lens assembly and an image sensor that perform image capture, is attached to the first image capturing apparatus 102 and has a rotation mechanism that can drive the lens barrel 202 so as to rotate the same relative to a fixed unit 203. A tilt rotation unit 204 is a motor driving mechanism that can rotate the lens barrel 202 in a pitch direction shown in FIG. 2B, and a pan rotation unit 205 is a motor driving mechanism that can rotate the lens barrel 202 in a yaw direction. They enable the lens barrel 202 to rotate in the directions corresponding to two or more axes. Note that FIG. 2B shows the definition of axes in the state of installation of FIG. 2A. An angular velocity meter 206 and an accelerometer 207 are both mounted on the fixed unit 203 of the first image capturing apparatus 102. Also, a later-described apparatus shake detection unit 309 detects vibration of the first image capturing apparatus 102 based on the angular velocity meter 206 and the accelerometer 207, and drives the tilt rotation unit 204 and the pan rotation unit 205 so as to rotate them based on the detected shake angle. In this way, a deflection and an inclination of the lens barrel 202, which is a movable unit, are is corrected.

FIG. 3 is a block diagram showing a configuration of the first image capturing apparatus 102 according to the present embodiment.

In FIG. 3, a first control unit 323 includes a processor (e.g., a CPU, a GPU, a microprocessor, an MPU, or the like) and a memory (e.g., a DRAM, an SRAM, or the like). They control the discrete blocks of the first image capturing apparatus 102, and control data transfer between the discrete blocks, by executing various types of processing. A non-volatile memory (Flash ROM) 316 is an electrically erasable and recordable memory, and stores constants for the operations of the first control unit 323, a program, and the like.

In FIG. 3, a zoom unit 301 includes a zoom lens that performs variable magnification. A zoom driving control unit 302 controls driving of the zoom unit 301. A focus unit 303 includes a lens that performs focus adjustment. A focus driving control unit 304 controls driving of the focus unit 303.

In an image capturing unit 306, the image sensor receives light that is incident via each lens assembly, and information of charges corresponding to the amount of the received light undergoes analog-to-digital (A/D) conversion and is output to an image processing unit 307. The image processing unit 307 applies image processing, such as distortion correction, white balance adjustment, and color interpolation processing, to digital image data, and outputs the digital image data after the application. In an image encoding unit 308, the digital image data output from the image processing unit 307 is converted into a recording format, such as a JPEG format, and transmitted to a memory 315 and a later-described video output unit 317.

A lens barrel rotation driving unit 305 drives the lens barrel 202 in the tilt direction and the pan direction by driving the tilt rotation unit 204 and the pan rotation unit 205.

The apparatus shake detection unit 309 includes, for example, the angular velocity meter 206 that detects the angular velocities of the first image capturing apparatus 102 in the triaxial directions, and the accelerometer 207 that detects the accelerations of the apparatus in the triaxial directions. The apparatus shake detection unit 309 calculates a rotation angle of the apparatus, a shift amount of the apparatus, and the like based on the detected signals.

A sound input unit 313 obtains sound signals around the first image capturing apparatus 102 from a microphone provided in the first image capturing apparatus 102, applies analog-to-digital conversion thereto, and transmits the resultant sound signals to a sound processing unit 314. The sound processing unit 314 executes sound-related processing, such as processing for making the input digital sound signals appropriate. Then, the first control unit 323 transmits the sound signals processed by the sound processing unit 314 to the memory 315. The memory 315 temporarily stores the image signals and the sound signals that have been obtained by the image processing unit 307 and the sound processing unit 314.

The image processing unit 307 and the sound processing unit 314 read out the image signals and the sound signals that are temporarily stored in the memory 315, and perform encoding of the image signals, encoding of the sound signals, and the like, thereby generating compressed image signals and compressed sound signals. The first control unit 323 transmits these compressed image signals and compressed sound signals to a recording/reproduction unit 320.

The recording/reproduction unit 320 records, for example, the compressed image signals and the compressed sound signals that have been generated by the image processing unit 307 and the sound processing unit 314, as well as other control data related to shooting, into a recording medium 321. Furthermore, in a case where the sound signals are not compressed and encoded, the first control unit 323 transmits the sound signals generated by the sound processing unit 314 and the compressed image signals generated by the image processing unit 307 to the recording/reproduction unit 320, and causes them to be recorded into the recording medium 321.

The recording medium 321 may be a recording medium built in the first image capturing apparatus 102, or may be a removable recording medium. The recording medium 321 can record various types of data, such as the compressed image signals, the compressed sound signals, and the sound signals generated by the first image capturing apparatus 102; a medium that has a larger capacity than the nonvolatile memory 316 is typically used thereas. For example, the recording medium 321 includes recording mediums of a variety of types, such as a hard disk, an optical disc, a magneto-optical disc, a CD-R, a DVD-R, a magnetic tape, a nonvolatile semiconductor memory, and a flash memory.

The recording/reproduction unit 320 reads out (reproduces) the compressed image signals, the compressed sound signals, the sound signals, and various types of data recorded in the recording medium 321. Then, the first control unit 323 transmits the compressed image signals and the compressed sound signals that have been read out to the image processing unit 307 and the sound processing unit 314. The image processing unit 307 and the sound processing unit 314 cause the compressed image signals and the compressed sound signal to be temporarily stored in the memory 315, decode them in a predetermined procedure, and transmit the decoded signals to the video output unit 317 and a sound output unit 318.

The sound input unit 313 includes a plurality of microphones, and the sound processing unit 314 can detect the directions of sounds using the plurality of microphones installed on a plane, and is used in the later-described search and automatic shooting. Furthermore, the sound processing unit 314 detects specific sound commands. It is permissible to adopt a configuration in which the sound commands include commands that have been registered in advance, and in addition, a user can register specific sounds with the image capturing apparatus. Furthermore, sound scene recognition is also performed. In the sound scene recognition, a sound scene determination is made by a network that has been trained using machine learning based on a massive amount of sound data pieces that have been prepared in advance. For example, a network for detecting specific scenes in which "a cheer has risen", "an applause has been given", "a voice has been uttered", and the like is set in the sound processing unit 314. Then, in the configuration, once a specific sound scene or a specific sound command has been detected, a detection trigger signal is output to the first control unit 323 and a second control unit 311.

The second control unit 311 is a control unit that is provided separately from the first control unit 323, and controls a supply power source of the first control unit 323.

A first power source unit 310 and a second power source unit 312 supply power sources for causing the first control unit 323 and the second control unit 311 to operate, respectively. The second power source unit 312 is in an always-ON state when an external power is supplied thereto from a battery, an adapter, or a USB, and supplies a power source to the second control unit 311. The second control unit 311 is always in an operating state when a power source is supplied thereto, and executes processing for determining whether to activate the first control unit 323 based on depression of the power source button provided in the first image capturing apparatus 102, or on input information from the apparatus shake detection unit 309 and the sound processing unit 314. The first power source unit 310 is activated based on the result of the activation determination made by the second control unit 311, and supplies a power source to the first control unit 323. Upon receiving a supplied power source, the first control unit 323 starts an operation in conformity with the factor of activation by the second control unit 311.

The sound output unit 318 outputs a preset sound pattern from a speaker built in the first image capturing apparatus 102, for example, at the time of shooting and the like.

An LED control unit 324 controls an LED provided in the first image capturing apparatus 102 so that the LED is lit or flashes in a pattern that has been determined in advance, for example, at the time of shooting and the like.

The video output unit 317 is composed of, for example, a video output terminal, and transmits image signals so as to display a video on a connected external display and the like. Furthermore, the sound output unit 318 and the video output unit 317 may be a single combined terminal, such as a terminal like a high-definition multimedia interface (HDMI®) terminal.

A communication unit 322 is disposed in order to perform communication between the first image capturing apparatus 102 and an external apparatus, and transmits and receives such data as sound signals and image signals, for example. Furthermore, it receives control signals related to shooting, such as a command for starting or ending shooting, panning or tilting, and zoom driving, and drives the first image capturing apparatus 102 in accordance with an instruction from an external device that can perform mutual communication with the first image capturing apparatus 102. In addition, it transmits and receives information, such as various types of learning-related parameters that are processed in a later-described learning processing unit 319, between the first image capturing apparatus 102 and an external apparatus. The communication unit 322 is, for example, a wireless communication module, such as an infrared communication module, a Bluetooth communication module, and a wireless LAN communication module.

When the faces of people around have been found while the first image capturing apparatus 102 is activated, a face authentication unit 325 executes face authentication processing with respect to the faces that have been found, and determines whether they match facial images of people received from the aforementioned learning server 107. The types of the face authentication processing include, for example, a 2D authentication method that performs authentication by recognizing the positions of the eyes, nose, mouth, and the like of faces, and cross-referencing them with a database. Furthermore, the types include, for example, a 3D authentication method that performs authentication using an infrared sensor or a dot projector, in addition to the 2D method.

A setting unit 326 sets a shooting release condition in accordance with facial information of a person who has been authenticated by the face authentication unit 325. The shooting release condition is determined based on an image evaluation value and a shooting threshold value. The image evaluation value is a value that serves as an index indicating whether a scene captured by the first image capturing apparatus 102 is a scene suitable for shooting, and is obtained based on face detection information, face authentication information, a degree to which the eyes are closed, a facial expression of a subject, a direction of a face, a size of a subject, and the like. Also, the shooting threshold value is a value that serves as a reference, and shooting is performed when the image evaluation value exceeds the shooting threshold value; the shooting threshold value is a value that is determined based on a shooting frequency, a time period that has elapsed since the last shooting, and the like.

A scene distinction unit 327 receives scene distinction information that has been machine-learned in the learning server 107 via the Internet 100 and the local network 101, and distinguishes whether a shooting scene has changed. Also, the scene distinction unit 327 may detect a movement in images from image signals of the image processing unit 307 by itself, and determine whether a shooting scene has changed. For example, it detects entering or leaving of people and a movement of an installed object in images, and distinguishes a change of an event in a sports festival, a change of a performance in a school play, and so on.

Note that the second image capturing apparatus 108 also has a configuration similar to that of the first image capturing apparatus 102 shown in FIGS. 2A and 2B and FIG. 3.

<Flow of Processing>

Figure 4A:
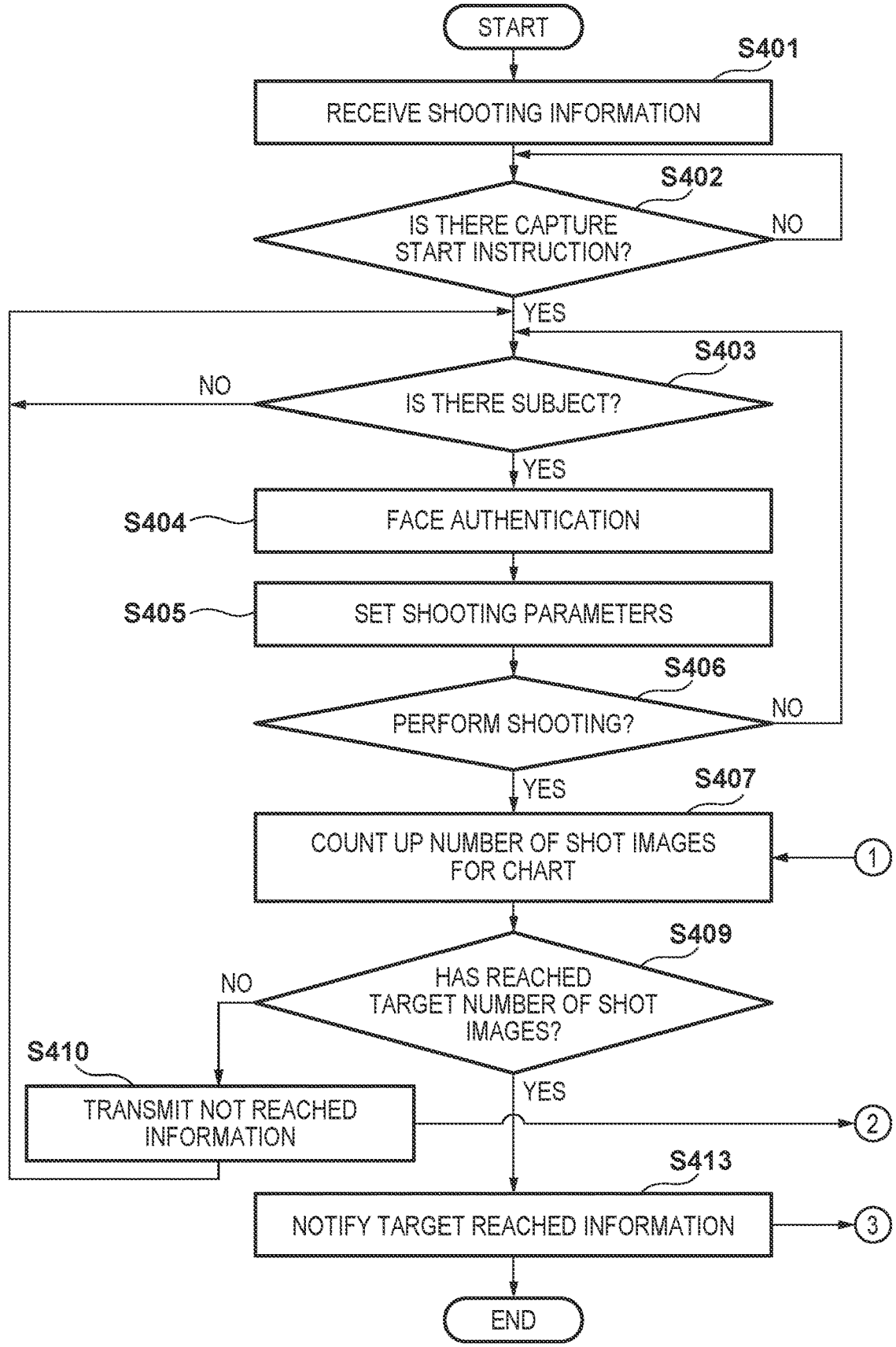
Figure 5A:
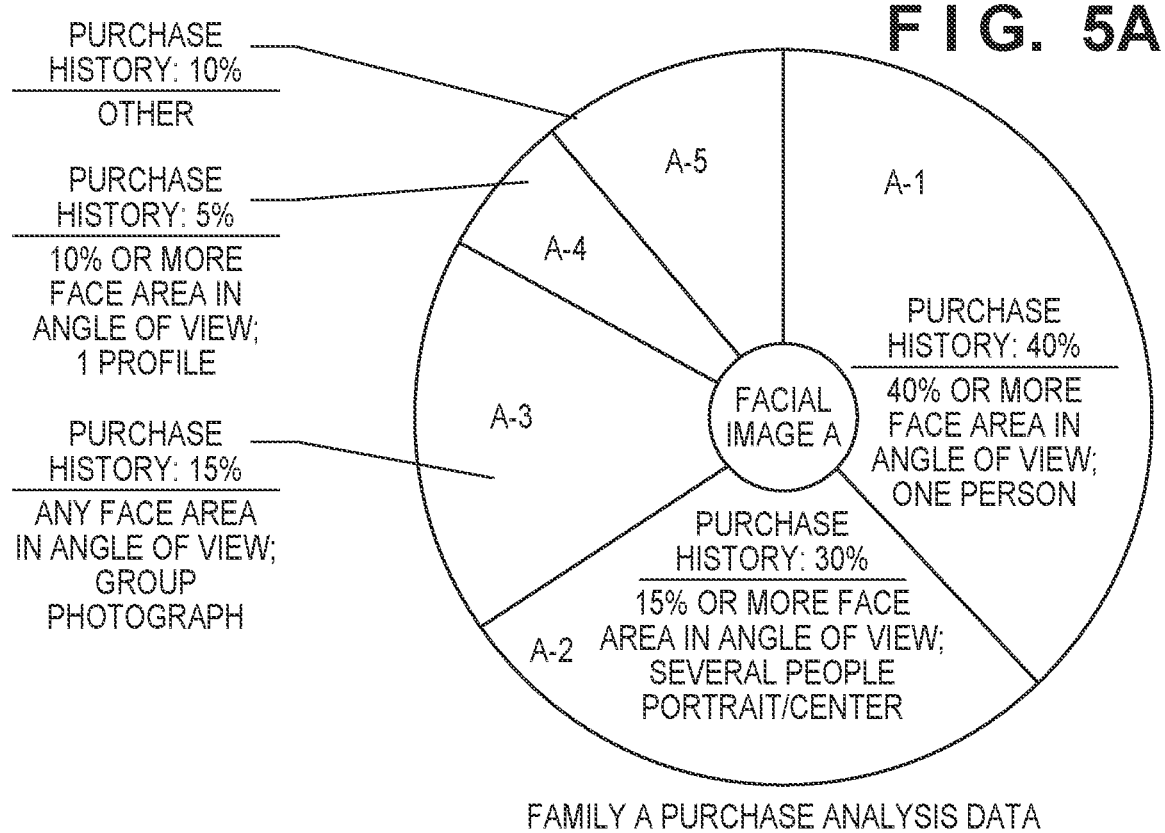
FIGS. 5A to 5D are diagrams showing an example of a learning model analyzed by a learning server.
Figure 5B:
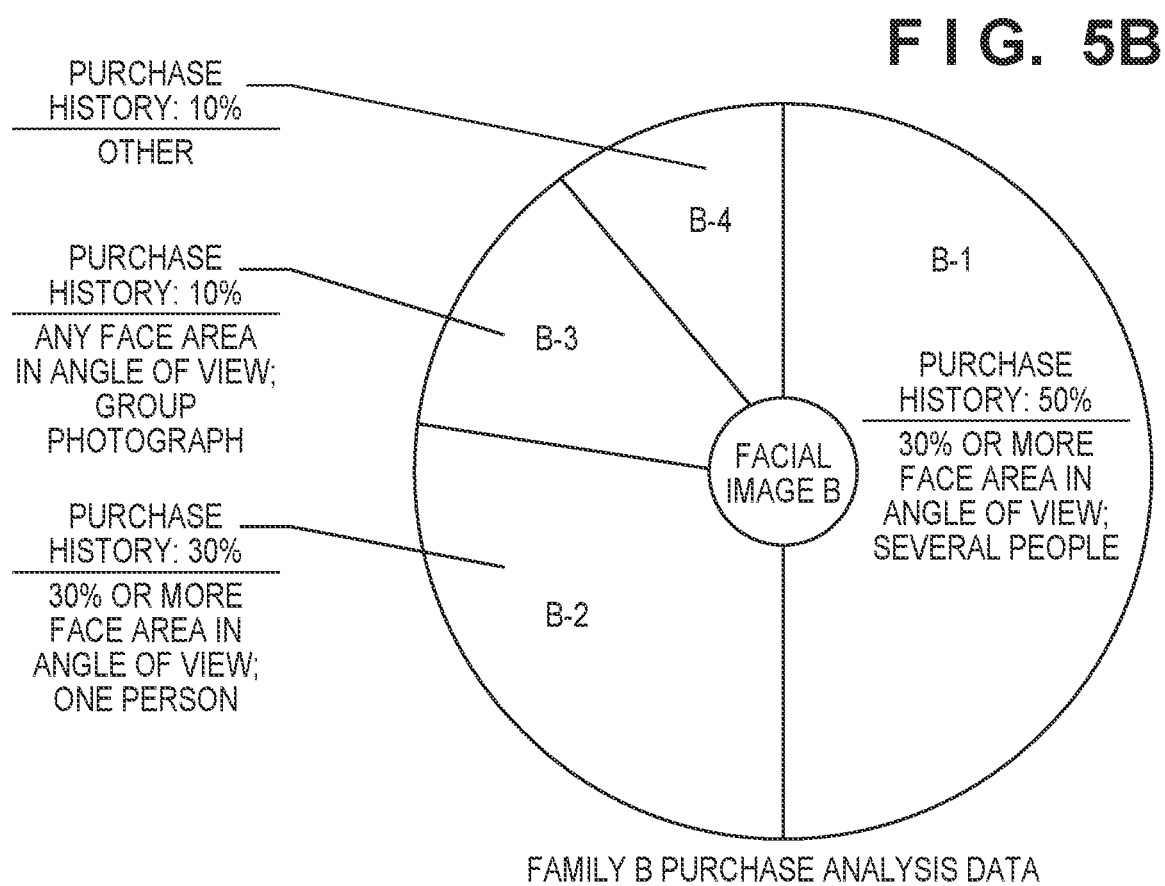
Figure 5C:
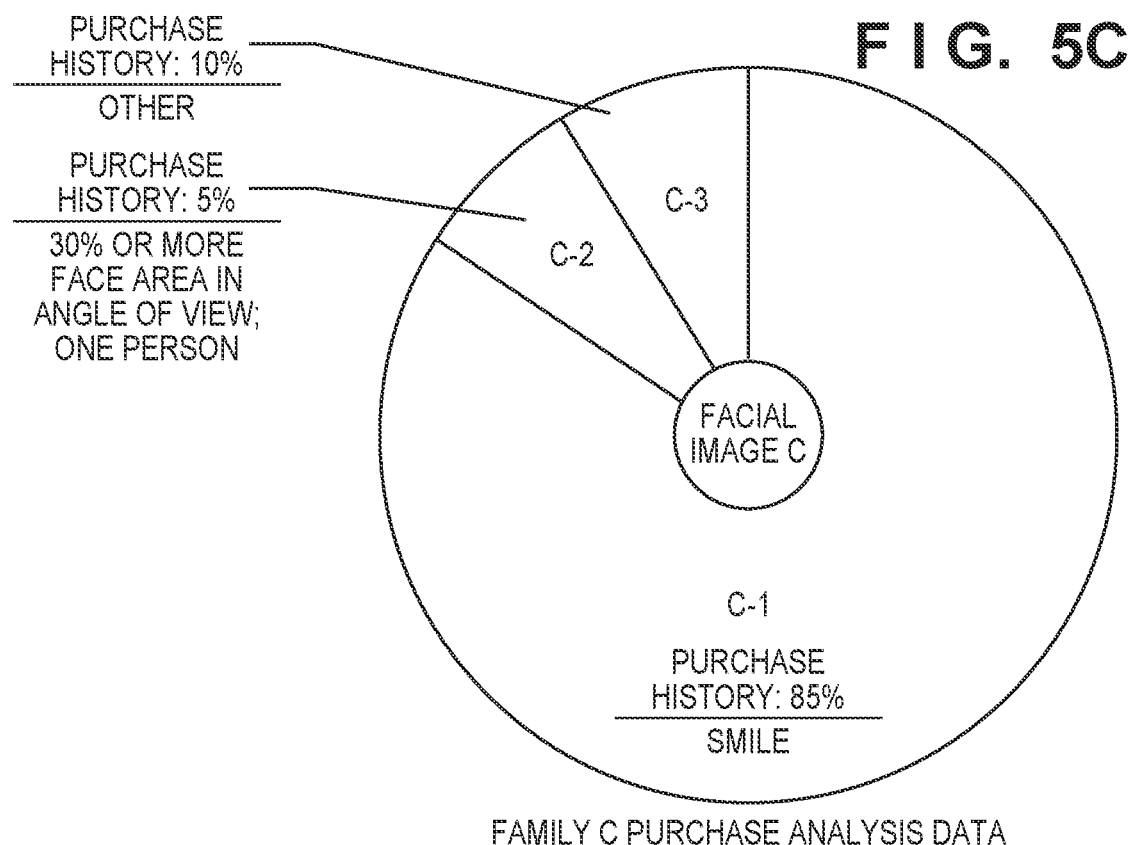
Figure 5D:
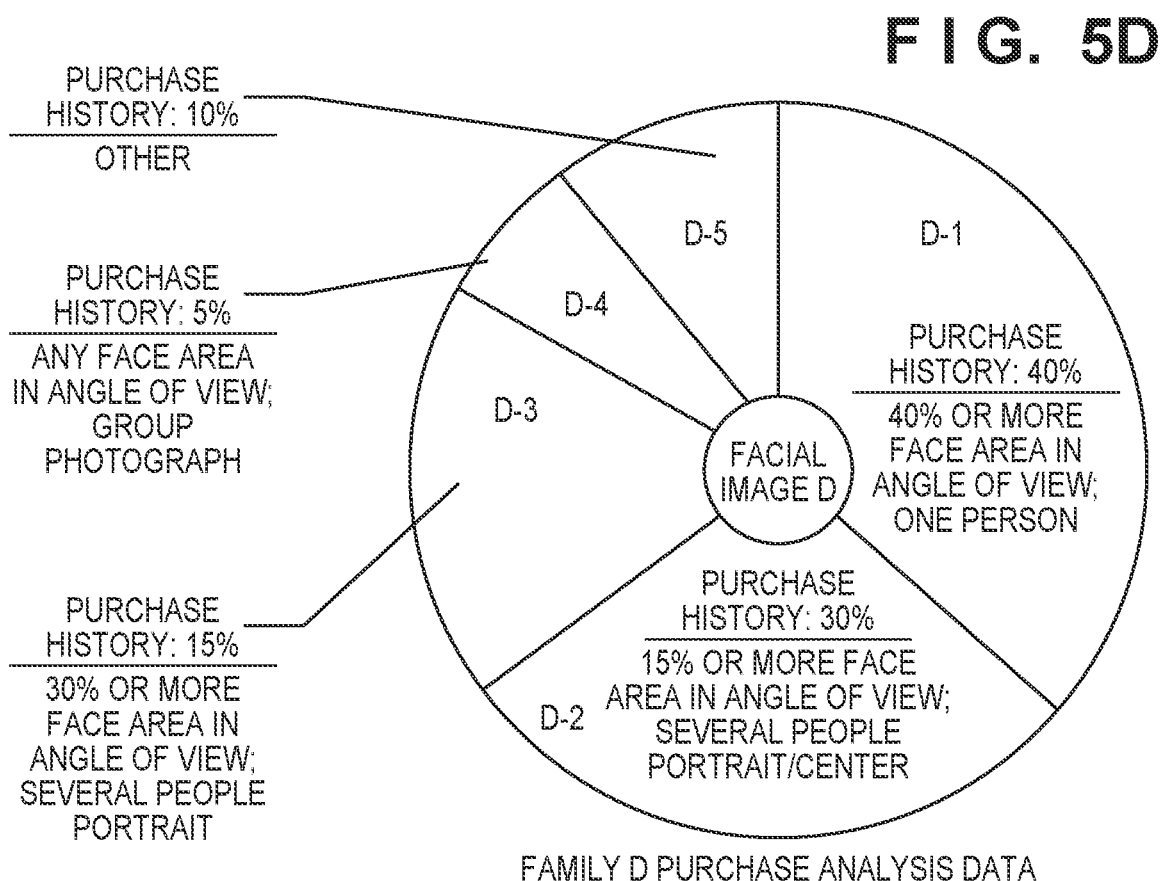
Figure 6A:
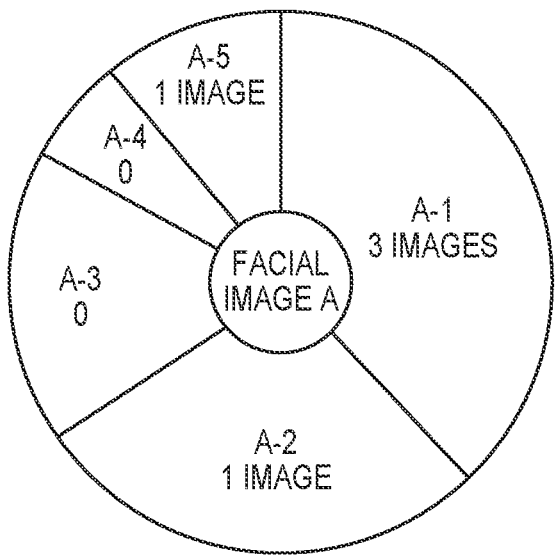
FIGS. 6A to 6D are diagrams each showing a chart of the counted number of shot images, which records the number of shot images.
Figure 6B:
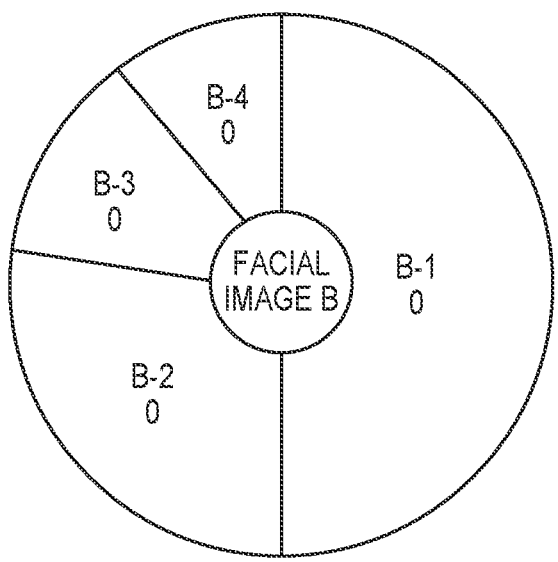
Figure 6C:
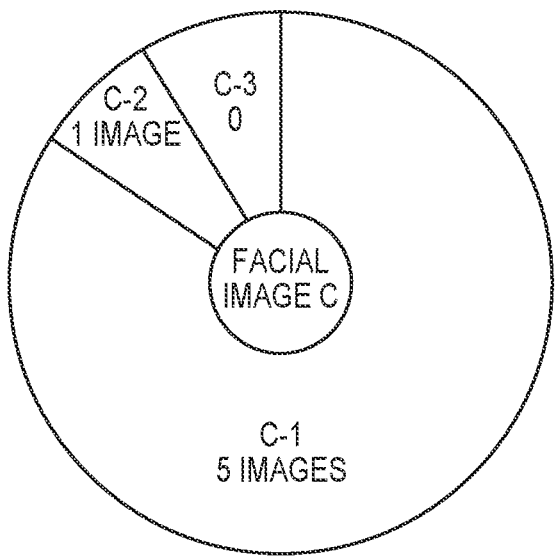
Figure 6D:
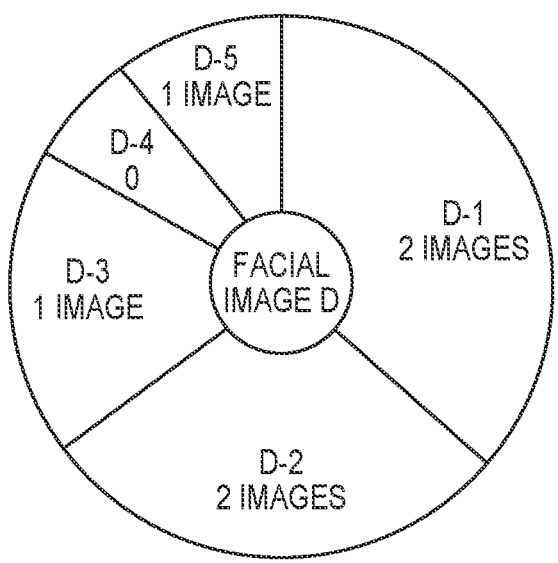

FIGS. 4A and 4B are flowcharts showing the operations of the image capturing apparatuses in the present embodiment.

In the present embodiment, the first image capturing apparatus 102 acts as a master, the second image capturing apparatus 108 acts as a slave, and automatic shooting is performed using these plurality of image capturing apparatuses.

Below, a flow of processing of the image capturing system according to the present embodiment will be described in accordance with the flowcharts shown in FIGS. 4A and 4B. FIG. 4A shows the operation of the first image capturing apparatus 102 (master) and FIG. 4B shows the operation of the second image capturing apparatus 108 (slave).

Note that the operations of the flowcharts shown in FIGS. 4A and 4B are realized by the first control unit 323 executing the program stored in the nonvolatile memory 316 in the first image capturing apparatus 102 and the second image capturing apparatus 108. Furthermore, in FIGS. 4A and 4B, among the operations of the first image capturing apparatus 102 and the second image capturing apparatus 108, the operations that have the same step numerals indicate that they are the same operation performed by the first image capturing apparatus 102 and the second image capturing apparatus 108.

First, before the operations of the flowcharts of FIGS. 4A and 4B are started, a user inputs his/her identification information (ID) to the first image capturing apparatus 102 and the second image capturing apparatus 108 via an operation using the communication terminal 103 or the like.

Then, in step S401, the first image capturing apparatus 102 and the second image capturing apparatus 108 receive a learning model corresponding to the input user ID from the learning server 107 before starting automatic shooting. The learning model includes not only shooting conditions that are expected to be the later-described preferences of a user associated with a subject, but also distinction information for distinguishing a change of a shooting scene. The received learning model is recorded into the nonvolatile memory 316.

The learning model is generated by the learning server 107 using the following method, and is updated each time the user purchases an image.

Based on purchased image information pieces of respective users transmitted from the moving image providing server 105, the learning server 107 associates the user IDs assigned to the respective users (users' identification information pieces) with facial information pieces that are expected to be family members of the users. Also, based on purchased images and unpurchased images of discrete users in the past, the learning server 107 analyzes shooting conditions that are expected to be the preferences of discrete users associated with subjects, and stores the analysis results on a per-user basis. Furthermore, the users can also register (input) the shooting conditions of their preferences with the learning server 107 by themselves using the communication terminal 103 or the client terminal 104.

FIGS. 5A to 5D are diagrams showing an example of a learning model analyzed by the learning server 107.

The learning server 107 analyzes purchased images and unpurchased images of discrete users in the past. Also, for example, the analysis is made with a focus on the focal length (the size of the face of a subject), the number of people, the position of the subject thereamong (composition), the facial direction and the facial expression of the subject, a specific action such as running and raising hands, and so forth. However, the matters to be focused on in making the analysis are not limited to these.

In step S402, the first image capturing apparatus 102 and the second image capturing apparatus 108 stand by in a shooting standby state until a shooting start signal is input.

Once the shooting start signal has been input in step S402, then in step S403, the first image capturing apparatus 102 and the second image capturing apparatus 108 cause the tilt rotation unit 204, the pan rotation unit 205, and the zoom unit 301 to operate, and start the search for a subject (detection of a subject). At this time, the search for the subject is performed based on facial information received that was received from the learning server 107 in step S401. However, in the initial state, the priority degrees of subjects to be searched for are not set.

When the first image capturing apparatus 102 or the second image capturing apparatus 108 has detected the subject in step S403, the image capturing apparatus that has detected the subject specifies who the subject is using the face authentication unit 325 in step S404.

In step S405, the image capturing apparatus that has specified the subject calculates and sets shooting parameters so as to achieve a shooting condition which has been received from the learning server 107 in step S401 and which is expected to be the preference of the user associated with the subject. The shooting condition corresponds to the matters to be focused on that are analyzed by the learning server 107, and is, for example, the focal length (the size of the face of the subject), the number of people in an image, the position of the subject specified thereamong (composition), the facial direction and the facial expression of the subject, whether a specific action such as running and raising hands has been taken, and so forth. For example, in a case where the first image capturing apparatus 102 has specified a facial image A as a subject, shooting parameters are calculated and set so as to achieve a shooting condition included among A-1 to A-5 of FIG. 5A. Any one of the shooting conditions A-1 to A-5 may be set in the present step, and the first control unit 323 of the first image capturing apparatus 102 determines the shooting condition to be set in accordance with the state of the subject.

Once the shooting condition that is expected to be the preference of the user associated with the subject has been set in step S405, shooting is performed in step S406. In a case where the subject is mobile and the subject has been lost from sight, or in a case where shooting has not been able to be performed under the shooting condition that is expected to be the preference of the user associated with the subject, processing returns to step S403.

FIGS. 6A to 6D each show a chart of the counted number of shot images (the number of counts), which records the numbers of shot images in correspondence with the shooting conditions that are expected to be the preferences of the user associated with the subject.

The learning processing unit 319 generates the chart of the counted number of shot images in the nonvolatile memory 316 when the first image capturing apparatus 102 and the second image capturing apparatus 108 have received the learning model in step S401.

When the first image capturing apparatus 102 has performed shooting in step S406, the first image capturing apparatus 102 counts up the number of shot images corresponding to the condition under which the shooting has been performed in step S407. In the present embodiment, the first image capturing apparatus 102 acts as a master, and plays a role in managing the number of shot images in the entire automatic image capturing system of the present embodiment.

When the second image capturing apparatus 108 has performed shooting in step S406, the second image capturing apparatus 108 transmits information indicating which subject that has been shot under which shooting condition to the first image capturing apparatus 102, which is a master image capturing apparatus, in step S408. Once the first image capturing apparatus 102 has received shooting information of the second image capturing apparatus 108, it counts up the number of shot images corresponding to the shot subject and the condition in which the shooting has been performed, similarly to processing of step S407.

In step S409, for each subject, the first image capturing apparatus 102 distinguishes whether the counted number of shot images shown in FIGS. 6A to 6D has reached the target number of shot images at the ratio of the shooting conditions that are expected to be the preferences of each user shown in FIGS. 5A to 5D.

In a case where the target number of shot images has not reached in step S409, the first image capturing apparatus 102 transmits information indicating a subject and a shooting condition for which the target number of shot images has not been reached to the second image capturing apparatus 108 in step S410. In a case where a controller controlling the shooting by the second image capturing apparatus 108 is located outside the second image capturing apparatus 108, the information may be transmitted to the external device.

In step S411, the second image capturing apparatus 108 monitors whether the information has been transmitted from the first image capturing apparatus 102 in step S410. In a case where the second image capturing apparatus 108 cannot confirm the transmission of the information in step S410, the second image capturing apparatus 108 returns to step S403, and performs arbitrary shooting that can be performed therein.

In a case where the second image capturing apparatus 108 has confirmed in step S411 that the information has been transmitted in step S410, the subject to be searched for is changed to the subject received in step S411, for which the target number has not been reached, in step S412.

Thereafter, the first image capturing apparatus 102 and the second image capturing apparatus 108 perform shooting while repeating steps S403 to S412.

When the first image capturing apparatus 102 has detected that the total number of shot images has reached the target number of shot images for every subject in step S409, the first image capturing apparatus 102 transmits information indicating that the target number of shot images has been reached to the second image capturing apparatus 108 in step S413, and ends shooting.

In a case where the second image capturing apparatus 108 has received the information indicating that the target number of shot images has been reached in step S414, shooting is ended; in a case where the information has not been received, processing returns to step S403, and shooting is continued.

Note that although control has been performed to end shooting in a case where the first image capturing apparatus 102 has determined that the target number of shot images has been reached in the present embodiment, processing may continuously return to step S403 to continue shooting.

Furthermore, although the above has described that a subject targeted for shooting is a user him/herself, or a family member or an acquaintance of the user, the subject may be a non-human subject, such as an animal owned by the user and a personal belonging of the user.

In addition, according to the above description, the user inputs his/her ID, and the image capturing apparatus detects and shoots a subject associated with the user. However, conversely, an associated user may be specified from a subject detected by the image capturing apparatus, and this subject may be shot under a shooting condition that is expected to be the preference of this user.

As described above, control processing of the present embodiment makes it possible to shoot a subject in accordance with the ratio of shooting conditions that are expected to be the preferences of each user.

The first image capturing apparatus 102 and the second image capturing apparatus 108 can use the scene distinction unit 327 to distinguish whether a shooting scene has changed based on scene distinction information that has been machine-learned in the learning server 107.

Figure 7:
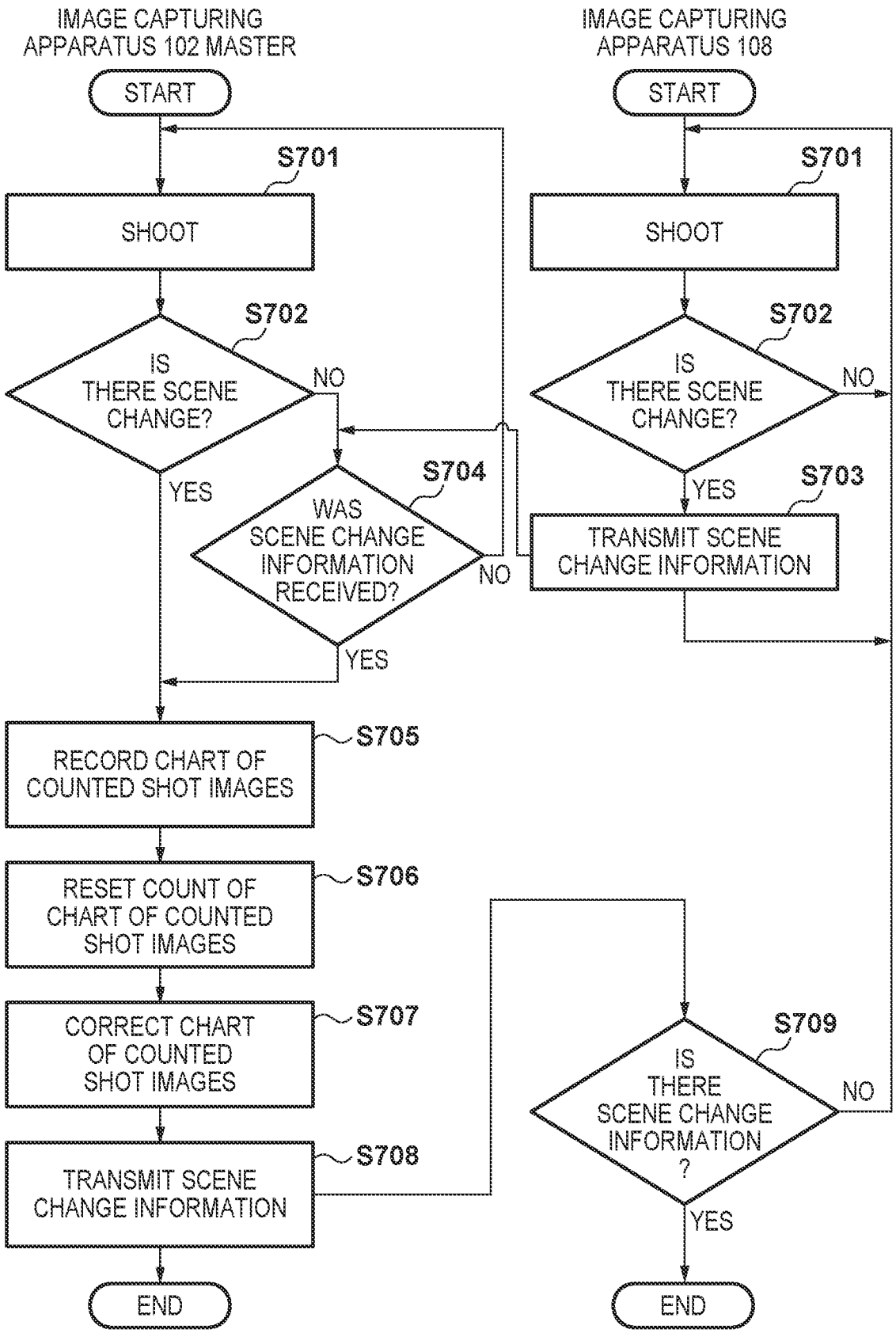
FIG. 7 is a flowchart showing control for a case where it has been determined that a shooting scene has changed.

FIG. 7 is a flowchart showing control for a case where it has been determined that a shooting scene has changed. The following describes a flow of processing in accordance with the flowchart shown in FIG. 7.

Note that the operations of the flowchart shown in FIG. 7 are also realized by the first control unit 323 executing the program stored in the nonvolatile memory 316 in the first image capturing apparatus 102 and the second image capturing apparatus 108. Furthermore, in FIG. 7 also, among the operations of the first image capturing apparatus 102 and the second image capturing apparatus 108, the operations that have the same step numerals indicate that they are the same operation performed by the first image capturing apparatus 102 and the second image capturing apparatus 108.

In step S701, the first image capturing apparatus 102 and the second image capturing apparatus 108 perform shooting in accordance with steps S403 to S414 of FIGS. 4A and 4B.

Concurrently, in step S702, the scene distinction unit 327 distinguishes whether a shooting scene has changed based on learning data received in step S401 in the first image capturing apparatus 102 and the second image capturing apparatus 108.

In a case where the scene distinction unit 327 of the second image capturing apparatus 108 has detected a change of a shooting scene in step S702, shooting scene change information is transmitted to the first image capturing apparatus 102 in step S703.

In a case where the scene distinction unit 327 of the second image capturing apparatus 108 has not detected a change in a shooting scene in step S702, the second image capturing apparatus 108 continues step S701, that is to say, shooting according to steps S403 to S414 of FIG. 4B.

In a case where the scene distinction unit 327 of the first image capturing apparatus 102 has determined that a shooting scene has not changed in step S702, the first image capturing apparatus 102 distinguishes whether the second image capturing apparatus 108 has detected a change of a shooting scene in step S704.

In a case where neither the first image capturing apparatus 102 nor the second image capturing apparatus 108 have detected a change of a shooting scene in step S704, the first image capturing apparatus 102 continues step S701, that is to say, shooting according to steps S403 to S414 of FIG. 4A.

When the first image capturing apparatus 102 has received the information transmitted in step S703, or has detected a change of a shooting scene through the scene distinction unit 327 therein in step S702, it records the resultant counted number of shot images shown in FIGS. 6A to 6D pertaining to the shooting performed thus far into the nonvolatile memory 316 in step S705.

In step S706, the first image capturing apparatus 102 resets (initializes) the up-to-date counted number of shot images shown in FIGS. 6A to 6D.

In step S707, the first image capturing apparatus 102 calculates, for each subject and each shooting condition, the number of shot images that are deficient based on the up-to-date resultant counted number of shot images recorded in step S705, and reflects the same in the counted number of shot images that has been reset in step S706.

The first image capturing apparatus 102 transmits the shooting scene change information, including the counted number of shot images, to the second image capturing apparatus 108 in step S708, and returns to step S402 shown in FIG. 4A.

In a case where the second image capturing apparatus 108 has received the shooting scene change information from the first image capturing apparatus 102 in step S709, it returns to step S402 shown in FIG. 4B. On the other hand, in a case where the first image capturing apparatus 102 has not given notice of a change of a shooting scene, processing returns to step S701, and shooting according to steps S403 to S414 of FIG. 4B is continued.

Although the present embodiment adopts a configuration in which the image capturing apparatuses include the scene distinction unit 327 and automatically detect a change of a shooting scene, a user may wirelessly notify the image capturing apparatuses of a shooting scene using the communication terminal 103.

Furthermore, although the present embodiment adopts a configuration in which the first image capturing apparatus 102 is fixed as a master and the second image capturing apparatus 108 is fixed as a slave, the roles of the master and the slave may be switched depending on circumstances.

The above-described control processing makes it possible to perform shooting, for each shooting scene, in accordance with the ratio of shooting conditions that are expected to be the preferences of each user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-138339, filed Aug. 31, 2022, which is hereby incorporated by reference herein in its entirety.

What is claimed is:

1. An image capturing apparatus to be used in an image capturing system that includes a plurality of image capturing apparatuses, the image capturing apparatus comprising:
at least one processor or circuit configured to function as:
a detection unit configured to detect a subject;
an authentication unit configured to authenticate correspondence between the subject and identification information of a user;
an obtainment unit configured to obtain shooting conditions associated with the subject authenticated by the authentication unit;
an image capturing unit configured to capture an image of the subject under the shooting conditions;
a count unit configured to count the number of captured images of the subject for each of the plurality of shooting conditions; and
a notification unit configured to notify a controller of another image capturing apparatus included among the plurality of image capturing apparatuses of the number of counts counted by the count unit.

2. The image capturing apparatus according to claim 1, wherein
the identification information of the user is input by the user.

3. The image capturing apparatus according to claim 1, wherein
the subject is the user him/herself, or a family member or an acquaintance of the user.

4. The image capturing apparatus according to claim 3, wherein
the subject is a human face.

5. The image capturing apparatus according to claim 1, wherein the at least one processor or circuit is configured to further function as a control unit configured to control the image capturing unit so as to capture an image of the subject until the number of counts reaches a target number.

6. The image capturing apparatus according to claim 5, wherein
the control unit controls the image capturing unit so as to perform image capture until a sum of the numbers of shot images that respectively correspond to the shooting conditions of the subject in the image capturing apparatus and the another image capturing apparatus reaches the target number.

7. The image capturing apparatus according to claim 1, wherein
the notification unit further notifies the controller of the another image capturing apparatus of the number of shot images that are deficient for each shooting condition of the subject.

8. The image capturing apparatus according to claim 7, wherein the at least one processor or circuit is configured to further function as a reception unit configured to receive, from the another image capturing apparatus, the number of images shot by the another image capturing apparatus among the number of shot images that are deficient.

9. The image capturing apparatus according to claim 1, wherein
the image capturing system is capable of communicating with a server that stores the identification information of the user, information of the subject corresponding to the identification information of the user, and information of the shooting conditions associated with the subject.

10. The image capturing apparatus according to claim 9, wherein
the obtainment unit obtains the identification information of the user, the information of the subject corresponding to the identification information of the user, and the information of the shooting conditions associated with the subject from the server.

11. The image capturing apparatus according to claim 9, wherein
the identification information of the user, the information of the subject corresponding to the identification information of the user, and the information of the shooting conditions associated with the subject can be input from a communication terminal.

12. The image capturing apparatus according to claim 1, wherein the at least one processor or circuit is configured to further function as a distinction unit configured to distinguish whether a shooting scene has changed,
wherein in a case where the distinction unit has made a distinction whereby the shooting scene has changed, the number of counts is stored, and the number of counts in the count unit is initialized.

13. The image capturing apparatus according to claim 12, wherein
in a case where the distinction unit has made a distinction whereby the shooting scene has changed, the number of shot images that are deficient is reflected in the initialized number of counts.

14. The image capturing apparatus according to claim 1, wherein
the shooting conditions are conditions related to at least one or more of a focal length, a size of the subject, the number of people in an image, a position of the subject, a facial direction of the subject, a facial expression of the subject, and whether the subject is making a specific action.

15. A control method for an image capturing apparatus to be used in an image capturing system that includes a plurality of image capturing apparatuses, the control method comprising:
detecting a subject;
authenticating correspondence between the subject and identification information of a user;
obtaining shooting conditions associated with the subject authenticated in the authenticating;
capturing an image of the subject under the shooting conditions;
counting the number of captured images of the subject for each of the plurality of shooting conditions; and notifying a controller of another image capturing apparatus included among the plurality of image capturing apparatuses of the number of counts counted in the counting.

16. A non-transitory computer-readable storage medium storing a program for causing a computer to execute each step of a control method for an image capturing apparatus to be used in an image capturing system that includes a plurality of image capturing apparatuses, the control method comprising:

detecting a subject;
authenticating correspondence between the subject and identification information of a user;
obtaining shooting conditions associated with the subject authenticated in the authenticating;
capturing an image of the subject under the shooting conditions;
counting the number of captured images of the subject for each of the plurality of shooting conditions; and
notifying a controller of another image capturing apparatus included among the plurality of image capturing apparatuses of the number of counts counted in the counting.

\* \* \* \* \*